United States Patent [19]

Shinkai et al.

[11] Patent Number: 4,540,915
[45] Date of Patent: Sep. 10, 1985

[54] FLUORESCENT LAMP AND PHOSPHOR COATING COMPOSITION USED THEREFOR

[75] Inventors: Kouki Shinkai, Tokyo; Naoki Hagiwara, Ome; Masaki Nakano, Tokyo, all of Japan

[73] Assignee: Hitachi, Ltd., Tokyo, Japan

[21] Appl. No.: 373,262

[22] Filed: Apr. 29, 1982

[30] Foreign Application Priority Data

Apr. 30, 1981 [JP] Japan ............................ 56-63935
Apr. 30, 1981 [JP] Japan ............................ 56-63936

[51] Int. Cl.$^3$ ................................................ H01J 1/63
[52] U.S. Cl. ............................ 313/486; 252/301.4 P; 252/301.6 P
[58] Field of Search .......... 250/453.1; 252/301.4 P, 252/301.6 P; 313/109, 493; 427/67, 157; 428/428; 501/50, 51, 52, 64, 65, 78, 79; 313/485, 486

[56] References Cited

U.S. PATENT DOCUMENTS 2,774,737 12/1956 Mager ............................ 501/17 X
3,222,214 12/1965 Lagos et al. ...................... 427/157
4,441,049 4/1984 Verstegen et al. ................ 313/486

Primary Examiner—Howard S. Williams
Attorney, Agent, or Firm—Antonelli, Terry & Wands

[57] ABSTRACT

A fluorescent lamp having a phosphor layer composed of a glass material represented by the general formula:

$$xLn_2O_3 \cdot yMO \cdot wM' \cdot vM''_2O \cdot zB_2O_3$$

(wherein Ln is at least one element selected from the group consisting of Y and lanthanum series elements, M is at least one element selected from the group consisting of Mg, Ca, Sr, Ba and Zn, M' is at least one oxide selected from the group consisting of $Al_2O_3$, $SiO_2$ and $Sb_2O_3$, M'' is at least one element selected from the group consisting of Li, Na and K, and x, y, z, w and v are the numerical values defined by $1 \leq x \leq 30$, $0 \leq y \leq 60$, $0 \leq w \leq 20$, $0 < v \leq 15$ and $30 \leq z \leq 80$ in molar percent, respectively, but y+w is a value defined by $0 \leq y+w \leq 60$ in molar percent), and a phosphor. Said glass material is insoluble in water and can be worked into a water-soluble slurry with said phosphor and other component materials for forming a phosphor layer.

11 Claims, No Drawings

FLUORESCENT LAMP AND PHOSPHOR COATING COMPOSITION USED THEREFOR

BACKGROUND OF THE INVENTION

This invention relates to a fluorescent lamp. More particularly the invention relates to a fluorescent lamp having a phosphor layer formed by using water-insoluble glass as adhesive material. The invention also pertains to a phosphor coating composition in the form of a slurry used for producing such fluorescent lamp.

For forming a phosphor layer on the inner wall of the glass tube in the conventional fluorescent lamps, there have been generally employed the techniques comprising suspending a phosphor and a low-melting-point glass powder in a solution prepared by dissolving a binder such as nitrocellulose in butyl acetate, coating the interior surface of the glass tube with this suspension, and then drying and baking the coating. If no adhesive material such as low-melting-point glass is added in said composition, the formed phosphor layer does not adhere fast to the glass tube and is prone to exfoliation. Particularly in the case of circular lamp, such phosphor layer tends to exfoliate in the step where the glass tube is shaped circularly.

Use of an organic solvent such as butyl acetate as in said composition is undesirable because of flammability of such organic solvent, its harmfulness to the human body, economy and other reasons. However, if a water-soluble binder solution is used, said low-melting-point glass might be dissolved or decomposed in water to give a baneful effect to the lamp characteristics of the produced fluorescent lamp. A variety of low-melting-point glass compositions have been proposed, but for example the prevalently used $CaO$-$BaO$-$B_2O_3$ glass is decomposed in water to elute $B_2O_3$ and hence unusable for the purpose said above.

SUMMARY OF THE INVENTION

An object of this invention is to provide a fluorescent lamp having a phosphor layer formed by coating the inner wall of the glass tube with a phosphor composition by using as adhesive material a low-melting-point glass powder which is scarcely dissolved in water or scarcely decomposed by water.

Another object of this invention is to provide a slurry material of phosphor which is usable as a water paint.

Still another object of this invention is to provide a slurry material of phosphor containing a low-melting-point glass powder which is scarcely dissolved or decomposed in water.

These and other objects of the invention can be accomplished by providing a fluorescent lamp having a phosphor layer composed of a glass material represented by the following general formula:

$$xLn_2O_3 \cdot yMO \cdot wM'\cdot zB_2O_3 \quad (I)$$

(wherein Ln is at least one element selected from the group consisting of Y and the elements of the lanthanum series, M is at least one element selected from the group consisting of Mg, Ca, Sr, Ba and Zn, M' is at least one oxide selected from the group consisting of $Al_2O_3$, $SiO_2$ and $Sb_2O_3$, and x, y, w and z are the numerical values defined by $1 \leq x \leq 30$, $0 \leq y \leq 60$, $0 \leq w \leq 20$ and $30 \leq z \leq 80$ in molar percent, but y+w is a value defined by $0 \leq y+w \leq 60$ in molar percent) and a phosphor blended in an amount of 10 to 1,000 parts by weight to one part by weight of said glass material, said phosphor layer being forced on the inner wall of the glass tube of said fluorescent lamp.

The above-said and other objects of the invention can be also accomplished by providing a fluorescent lamp having, as formed on the inner wall of its glass tube, a phosphor layer composed of a glass material represented by the following general formula:

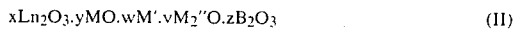

$$xLn_2O_3 \cdot yMO \cdot wM' \cdot vM_2''O \cdot zB_2O_3 \quad (II)$$

(wherein Ln, M and M' are as defined above, M'' is at least one element selected from the group consisting of Li, Na and K, x, y, w and z are the numerical values defined above, and v is a numerical value defined by $0 < v \leq 15$ in molar percent) and a phosphor blended in an amount of 10 to 1,000 parts by weight to one part by weight of said glass material.

The above-said and other objects of the invention can be further attained by providing a phosphor coating composition composed of a phosphor, a glass powder of the above-shown general formula (I) and/or (II) blended in an amount of 0.1 to 10% by weight based on said phosphor, and a water-soluble binder.

DETAILED DESCRIPTION OF THE PREFERRED EMBODIMENTS

The term "glass material" is used in this invention to not only refer to the so-called ordinary glass materials but also include the devitrified and crystalprecipitated glass such as opal glass, and it signifies the inorganic materials with low melting point and thermic melt. The term "water-insoluble (glass)" is used herein to refer to not only the glass which is completely insoluble in water but also a glass which is very slightly soluble in water but its solubility (in water) is limited to such a degree as exerting no significant influence to the lamp characteristics of the produced fluorescent lamp when such glass is formed into a slurry in practical use.

In this invention, as said above, a phosphor is used in an amount of 10 to 1,000 parts by weight, preferably 15 to 200 parts by weight, to one part by weight of the glass material. If the amount of the phosphor exceeds 200 parts by weight based on said glass material, the adhesive strength is somewhat weakened, and it is further weakened when the amount of the phosphor exceeds 1,000 parts by weight. On the other hand, too small amount of the phosphor results in a reduced luminous flux of the fluorescent lamp. Thus, in this invention, said phosphor is preferably used in an amount within the above-defined range. In the case of circular lamp, it is required that the phosphor layer is more fastly attached to the glass tube for the said reason, and hence, in this case, it is recommended to use the phosphor in an amount of 15 to 33 parts by weight to one part by weight of the glass material. On the other hand, in the case of straighttube lamp where no such high adhesive strength as in the case of circular lamp is required, the phosphor may be properly used in an amount of 25 to 200 parts by weight.

In case of using a glass material which contains $M_2''O$ in a high proportion, since the softening point of such material is low, a satisfactory result can be obtained with a relatively small amount of the glass material, that is, with a high phosphor content, but in case of using a glass material which contains no $M_2''O$ or contains this element but in a small quantity, it is necessary to use the glass material in a relatively high ratio. Also, as is generally known, in case the phosphor layer is formed by using a finely powdered glass material, the amount of the glass material required is relatively small.

Further, in production of circular lamp, it is required for shaping the glass tube into a circular form to elevate the surface temperature to approximately 800° C. in the case of soda-lime glass and approximately 650° C. in the case of lead glass, so that it is desirable that the softening point of the glass material is below these temperatures.

The value of x in the above-shown general formula is decided on the basis of the following facts. In case the value of x is less than 1 mol %, the glass material is high in the degree of decomposition or dissolution in water (hereinafter referred to simply as water solubility). Such water solubility is low when the value of x is greater than 1 mol %, and it becomes very low when the value of x is above 3 mol %. However, if the value of x exceeds 30 mol %, the softening point of the glass material is excessively elevated, so that said value should desirably be below 30 mol %, more preferably below 20 mol %. For these reasons, x is defined to be within the range of $1 \leq x \leq 30$, more preferably $1 \leq x \leq 20$, and most preferably $3 \leq x \leq 20$ in molar percent.

These facts are exemplified by the test results in Table 1, the tests having been conducted by using a glass material represented by the above-shown general formula where Ln is La and M is Zn, with no M' contained (w=0), that is, $La_2O_3 \cdot ZnO \cdot B_2O_3$ glass.

In Table 1, "water solubility" is expressed by way of percent reduction of the glass weight as measured when 35- to 45-mesh glass powder was heated in hot water of 100° C. for one hour. Softening point is the temperature at which the glass fibers having a uniform diameter of 0.55-0.75 mm and a length of 23.9 cm were caused to stretch at a rate of 1 mm/min under dead load when the upper portions (along a length of 10 cm from the top end) of said glass fibers were heated at a rate of about 5° C./min. It will be noted that even those glass fibers whose softening point is unmeasurable by this method can be used for said purpose by powdering them as they (in powdered form) are merely required to be softened by heating to such an extent that desired adhesion can be attained.

TABLE 1

| No. | Composition (mol %) | | | Softening point (°C.) | Water solubility (%) |
|---|---|---|---|---|---|
| | $La_2O_3$ | ZnO | $B_2O_3$ | | |
| 1 | 0 | 50 | 50 | — | 9.40 |
| 2 | 1 | 49 | " | — | 2.00 |
| 3 | 2 | 48 | " | — | 1.10 |
| 4 | 3 | 47 | " | — | 0.60 |
| 5 | 5 | 45 | " | 644 | 0.22 |
| 6 | 10 | 10 | 80 | — | 0.12 |
| 7 | " | 20 | 70 | — | 0.60 |
| 8 | " | 40 | 50 | 640 | 0.70 |
| 9 | " | 50 | 40 | 615 | 0.83 |
| 10 | " | 60 | 30 | — | — |
| 11 | 20 | 0 | 80 | — | 0.18 |
| 12 | " | 10 | 70 | 723 | 0.87 |
| 13 | " | 30 | 50 | — | 0.97 |

As regards the elements represented by Ln, no much difference is seen in softening point when using other elements than La. However, in case the element represented by Ln is Ce, the glass material presents a yellowish brown to dark brown color, so that the fluorescent lamp produced by using such material is somewhat deteriorated in luminous flux. It is therefore recommended to use other elements than Ce as Ln. In case the element represented by Ln is Nd, Sm, Dy, Ho, Er or Tm, the glass material is slightly tinted though its stays transparent, as shown in Table 2. Therefore, in case of using these elements, it is desirable that the value of x is within the range of $1 \leq x \leq 10$ mol %. When using other elements, the glass material is almost colorless. Table 2 shows the results of the tests conducted on the $Ln_2O_3 \cdot ZnO \cdot B_2O_3$ (10:40:50 by mole) glass materials.

TABLE 2

| No. | Ln | Color | Softening point (°C.) | Water solubility (%) |
|---|---|---|---|---|
| 8 | La | | 640 | 0.70 |
| 14 | Y | | 673 | 0.57 |
| 15 | Ce | Yellowish to dark brown | 651 | 0.65 |
| 16 | Pr | | 649 | 0.16 |
| 17 | Nd | Purple | 652 | 0.13 |
| 18 | Sm | Yellow | 657 | 0.32 |
| 19 | Eu | | 661 | 0.49 |
| 20 | Gd | | 664 | 0.37 |
| 21 | Tb | | 664 | 0 |
| 22 | Dy | Yellow | 668 | 0.10 |
| 23 | Ho | Orange to pink | 670 | 0.53 |
| 24 | Er | Pink | 675 | 0 |
| 25 | Tm | Light green | 675 | 0.69 |
| 26 | Yb | | 676 | 0.56 |

Zn, Mg and Ca are preferred as the element expressed by M in the above-shown general formula. Use of Sr and Ba causes a slight rise of water solubility. Therefore, in case of using Sr, the amount thereof should preferably be less than 40 mol %, more preferably less than 30 mol %, and in case of using Ba, the amount thereof should preferably be less than 40 mol %, more preferably less than 20 mol %. The compositions of these glass materials are shown in Table 3.

Also, the value of y is preferably below 60 mol %, more preferably below 50 mol %, because the greater value of y is deleterious to vitrification.

TABLE 3

| No. | Composition | | | Softening point (°C.) | Water solubility (%) |
|---|---|---|---|---|---|
| | Ln (mol %) | M (mol %) | $B_2O_3$ (mol %) | | |
| 27 | La(10) | Mg(40) | 50 | 692 | 0.32 |
| 28 | " | Ca(40) | " | — | 1.36 |
| 29 | " | Sr(40) | " | 654 | 3.23 |
| 30 | " | Mg(30)Sr(10) | " | 688 | 0.55 |
| 31 | " | Mg(20)Sr(20) | " | 677 | 0.74 |
| 32 | " | Mg(10)Sr(30) | " | 666 | 1.40 |
| 33 | " | Mg(30)Ca(10) | " | 693 | 0.85 |
| 34 | " | Mg(20)Ca(20) | " | 687 | 0.50 |
| 35 | " | Mg(10)Ca(30) | " | 680 | 0.98 |
| 36 | " | Mg(30)Ba(10) | " | 680 | 0.96 |
| 37 | " | Mg(20)Ba(20) | " | 659 | 0.67 |
| 38 | " | Mg(10)Ba(30) | " | — | 2.32 |
| 39 | " | Mg(30)Zn(10) | " | 683 | 1.13 |
| 40 | " | Mg(20)Zn(20) | " | 669 | 0.24 |
| 41 | " | Mg(10)Zn(30) | " | 658 | 0.44 |
| 42 | Y(10) | Mg(40) | " | 727 | 0.42 |
| 43 | " | Ca(40) | " | — | 1.11 |
| 44 | " | Sr(40) | " | 681 | 1.90 |
| 45 | " | Ba(40) | " | 639 | 5.24 |
| 46 | " | Zn(40) | " | 673 | 0.57 |
| 47 | Gd(10) | Mg(40) | " | 723 | 0.52 |
| 48 | " | Ca(40) | " | 695 | 1.96 |
| 49 | " | Sr(40) | " | 674 | 4.01 |
| 50 | " | Ba(40) | " | 628 | 3.25 |
| 51 | " | Zn(40) | " | 664 | 0.37 |

The oxides represented by M' are $Al_2O_3$, $SiO_2$ and $Sb_2O_3$. Among them, $Sb_2O_3$ shows a tendency to lower the softening point, while $Al_2O_3$ and $SiO_2$ tend to rather elevate the softening point but have the effect of lowering water solubility. Therefore, $Al_2O_3$ or $SiO_2$ is preferably used in case the glass material is elevated in its water solubility because of use of Ba or Sr as the element represented by M.

For these reasons, the value of w is preferably defined to be within the range of $0 \leq w \leq 20$ mol %, more preferably $0 \leq w \leq 10$ mol %.

Table 4 shows the properties of the glass material of various compositions containing an oxide represented by M'.

TABLE 4

| No. | Composition (mol %) | | | | Softening point (°C.) | Water solubility (%) |
| --- | --- | --- | --- | --- | --- | --- |
| | $La_2O_3$ | MO | M' | $B_2O_3$ | | |
| 52 | 10 | ZnO: 40 | $Al_2O_3$: 10 | 40 | — | 0.09 |
| 53 | " | ZnO: 45 | $Al_2O_3$: 5 | " | 630 | 0.48 |
| 54 | " | ZnO: 40 | $SiO_2$: 10 | " | 654 | 0.09 |
| 55 | " | ZnO: 40 | $Al_2O_3$: 5 $SiO_2$: 5 | " | 658 | 0.25 |
| 56 | " | ZnO: 35 | $Al_2O_3$: 5 $SiO_2$: 10 | " | 677 | 0.18 |
| 57 | " | ZnO: 35 | $Al_2O_3$: 10 $SiO_2$: 5 | " | 669 | 0.71 |
| 58 | 8 | ZnO: 40 | $Sb_2O_3$: 2 | 50 | 642 | 0.13 |
| 59 | 5 | ZnO: 40 | $Sb_2O_3$: 5 | " | 615 | 0.42 |
| 60 | 10 | SrO: 30 | $SiO_2$: 10 | " | 708 | 1.55 |
| 61 | " | SrO: 35 | $Al_2O_3$: 5 | " | 662 | 2.77 |

It will be seen that the glass material Nos. 52–57 containing $SiO_2$ or $Al_2O_3$ are lower in solubility than the glass material No. 9 in Table 1. Also, the glass material Nos. 60 and 61 are reduced in water solubility as compared with the glass material No. 29 in Table 3. These are indicative of the effect of $SiO_2$ and $Al_2O_3$ on water solubility of the glass material.

The value of z is preferably within the range defined by $30 \leq z \leq 80$ mol %, more preferably $40 \leq z \leq 70$ mol %, for retaining the properties of glass.

Regarding now the compounds represented by $M_2''O$, addition of even a slight amount of such compound proves effective for lowering the softening point, but an appreciable effect is provided when such compound is added in an amount greater than 1 mol %. However, use of these compounds in excess of 10 mol % results in a reduced luminous flux, with the extent of reduction of luminous flux being sharply enlarged when the amount of the compound added exceeds 15 mol %. Thus, the preferred range of v is $1 \leq v \leq 15$ mol %, most preferably $1 \leq v \leq 10$ mol %. The properties of the glass material compositions containing $M_2''O$ are shown in Table 5.

TABLE 5

| No. | Composition (mol %) | | | | Softening point (°C.) | Water solubility (%) |
| --- | --- | --- | --- | --- | --- | --- |
| | Ln | M | M" | $B_2O_3$ | | |
| 62 | Gd(10) | Mg(35) | Li(5) | 50 | 669 | 0.74 |
| 63 | La(5) | Zn(40) | Li(10) | 45 | 555 | 0.28 |
| 64 | La(10) | Mg(35) | Na(5) | 50 | 665 | 0.44 |
| 65 | Gd(10) | Zn(40) | Na(10) | 40 | 570 | 0.42 |
| 66 | Y(10) | Sr(35) | K(5) | 50 | 650 | 3.13 |
| 67 | La(10) | Mg(39) | Li(1) | 50 | 688 | 0.32 |
| 68 | La(10) | Mg(37) | Li(3) | 50 | 673 | 0.33 |
| 69 | La(10) | Mg(36) | Li(4) | 50 | 662 | 0.20 |
| 70 | La(10) | Mg(35) | Li(5) | 50 | 655 | 0.32 |
| 71 | La(10) | Mg(30) | Li(10) | 50 | 619 | 0.38 |
| 72 | La(10) | Mg(25) | Li(15) | 50 | 598 | 1.40 |

From a comparison between the glass material Nos. 47, 27 and 44 which contain no element of M" and the glass material Nos. 62, 64 (70) and 66 which correspond respectively to Nos. 47, 27 and 44 regarding Ln and M but contain an element of M", it is apparent that the softening point of the glass material is lowered by addition of an element of M". Also, from Nos. 67-72, there is noted a tendency that any increment of the amount of the element M" leads to a corresponding reduction of the softening point.

The glass material may be produced, for instance, in the following way.

48.87 g of $La_2O_3$, 50.60 g of $MgCO_3$ and 52.23 g of $B_2O_3$ are precisely weighed and mixed well in a ball mill. The mixture is melted by heating at 1,200°–1,250° C. for 2–3 hours and the molten glass is charged into water for quick cooling. Then the glass is dried at 100°–120° C. for 10 hours and finely powdered in an agate-containing ball mill to obtain an $La_2O_3.MgO.B_2O_3$ (10/40/50 by molar ratio) glass powder. Glass powders of other compositions can be obtained likewise by changing the starting materials or their mixing ratios.

The glass material containing $M_2''O$ may be produced in the following way.

32.582 g (10 mol %) of $La_2O_3$, 29.51 g (35 mol %) of $MgCO_3$, 3.69 g (5 mol %) of $Li_2O_3$ and 34.809 g (50 mol %) of $B_2O_3$ are weighed and mixed well. The mixture is put into a heat-resistant vessel such as a platinum vessel and heated and melted in the air at 1,200° C. for 2 to 3 hours. The melt is charged into water for quick cooling. After sufficient hydroextraction, the product is dried and then ground well by a mortar or a ball mill to form powder with a specific surface area of 4,000 to 10,000 $cm^2/g$. The glass powder obtained in the manner described above showed a softening point of 655° C. and water solubility of 0.32%.

For forming a phosphor layer, an aqueous slurry composed of said powdered glass material, a phosphor and a water-soluble binder is applied on the inner wall of a glass tube to form a coating and then the coating is dried and heated.

As the water-soluble binder used for said slurry, there may be employed various types of water-soluble polymers (or copolymers) such as polyethylene oxide, hydroxyalkyl cellulose (such as hydroxyethyl cellulose, hydroxypropyl cellulose, etc.), ammonium methacrylate, carboxymethyl cellulose, polyvinyl alcohol, copolymer of isobutylene and maleic anhydride, etc.

Such water-soluble binder is preferably added in such an amount as to provide the aqueous solution with a viscosity of 60 to 150 CP, more preferably 70 to 140 CP, most preferably 90 to 120 CP.

In the case of polyethylene oxide, for instance, 0.8% by weight addition thereof gives a solution viscosity of about 120 CP.

In another method for forming said phosphor layer, the inner wall of a glass tube is electrically charged and a mixed powder of a phosphor and a glass material is also loaded with an electric charge of another pole and passed through the glass tube so that said powder adheres to the inner wall of the tube, then steam is further passed through the glass tube to let the phosphor adhere temporarily to the inner wall of the tube by dint of moisture, and then the tube is heated to effect fast adhesion.

The phosphor coating composition according to this invention may further comprises strontium nitrate and/or barium nitrate in an amount of 0.01 to 5% by weight, preferably 0.1 to 3% by weight, based on the phosphor.

As seen from the above-shown tables, said glass powder, although very low in water solubility, is soluble slightly in water. Therefore, if the composition of this invention is preserved in the form of an aqueous slurry, the glass component may be dissolved though slightly in the slurry, resulting in a reduction of luminous flux of the lamp produced by using such composition. In commercial production of fluorescent lamps, usually a large volume of phosphor coating composition is prepared in stock and the glass tubes are interiorly coated with the composition to form the lamps. Addition of said strontium nitrate and/or barium nitrate expedites combustion of the binder in the fluorescent lamp production process, resulting in an improved luminous flux of the produced lamps, and also has the effect of keeping the luminous flux of the lamp unaffected even when using the composition after long-time preservation in the form of an aqueous slurry. However, too much addition of these substances can adversely affect the luminous flux of the lamp, so that they should be used in the above-defined amount range.

The present invention is further described hereinbelow by way of the embodiments thereof.

The coating film strength of each of the produced fluorescent lamps was equal to or higher than that of the fluorescent lamps produced according to the conventional methods. Also, the luminous flux and lumen maintenance factor of said lamps as determined in a long lighting duration test were equal to or better than those of the conventional fluorescent lamps.

In Table 6, "Amount added" is the percent by weight of the glass material powder based on the phosphor, and "Decay factor in 100 hr" of the luminous flux is the percent reduction of the luminous flux in 100 hours based on the luminous flux of 0 hour. The lumen maintenance factor in 1000 hours is the value determined based on the luminous flux at 100-hour point which was given as 100% for criterion. Such maintenance factor in 1000 hours was omitted for a part of the fluorescent lamps.

The Comparative Example is a fluorescent lamp similarly produced by using conventional $CaO.BaO.2.5-B_2O_3$ glass powder as glass material and also using nitrocellulose in an organic solvent (butyl acetate) as binder. The water solubility of this glass material was about 20%, and it was impossible to produce a fluorescent lamp from a combination of this glass material and a water-soluble binder.

TABLE 6

| Example No. | Glass Composition (mol %) | | | | Softening point (°C.) | Amount added (wt %) | Luminous flux 0 hr (lm) | 100 hr (lm) | Decay factor (%) | 1,000 hr (lm) | (%) |
|---|---|---|---|---|---|---|---|---|---|---|---|
| | Ln | M | M' | $B_2O_3$ | | | | | | | |
| 1 | La(5) | Zn(45) | — | 50 | 644 | 4 | 1858 | 1761 | 5.2 | 1608 | 91.3 |
| 2 | La(10) | Zn(40) | — | 50 | 640 | 4 | 1859 | 1777 | 4.4 | 1603 | 90.2 |
| 3 | La(20) | — | — | 80 | — | 4 | 1849 | 1739 | 6.0 | 1599 | 91.9 |
| 4 | La(10) | Mg(40) | — | 50 | 692 | 4 | 1848 | 1742 | 5.7 | 1573 | 90.3 |
| 5 | La(10) | Sr(40) | — | 50 | 654 | 4 | 1788 | 1723 | 3.6 | 1610 | 93.4 |
| 6 | Y(10) | Zn(40) | — | 50 | 673 | 4 | 1861 | 1769 | 4.9 | 1601 | 90.5 |
| 7 | La(10) | Mg(30) Zn(20) | — | 40 | 651 | 4 | 1806 | 1760 | 2.5 | | |
| 8 | La(10) | Mg(20) Zn(30) | — | 40 | 639 | 4 | 1826 | 1770 | 3.0 | | |
| 9 | La(10) | Zn(40) | $SiO_2(10)$ | 40 | 649 | 4 | 1841 | 1799 | 2.4 | | |
| 10 | La(10) | Zn(40) | $Al_2O_3(5)$ $SiO_2(5)$ | 40 | 653 | 4 | 1820 | 1785 | 1.9 | | |
| 11 | La(10) | Zn(35) | $Al_2O_5(5)$ $SiO_2(10)$ | 40 | 671 | 4 | 1818 | 1770 | 2.6 | | |
| 12 | La(10) | Zn(35) | $Al_2O_3(10)$ $SiO_2(5)$ | 40 | 664 | 4 | 1830 | 1773 | 3.1 | | |
| 13 | La(10) | Mg(40) | — | 50 | 692 | 7 | 1781 | 1729 | 2.9 | | |
| Comparative Example | | | | | 670 | 4 | 1861 | 1761 | 5.4 | 1589 | 90.3 |

EXAMPLES 1-13

The powdered glass materials of the compositions shown in Table 6 were added to 160 cc of a 0.8% polyethylene oxide solution, and the mixtures were finely pulverized by a ball mill, then added with 100 g of halophosphate phosphor and further mixed by the ball mill for 30 minutes to prepare the phosphor slurry specimens.

Each of thus prepared phosphor slurry specimens was coated on the interior surface of a 30 W fluorescent lamp glass tube and then hot air of about 60°-70° C. was flown through the tube to evaporate moisture in the coating to form a phosphor layer. The thus coated glass tube was thereafter treated in a usual way to form a circular fluorescent lamp.

EXAMPLES 14-18

30 W circular lamps were produced in the same way as Example 1 by using the glass powder compositions containing $M_2''O$. The results are shown in Table 7. As seen from the table, the glass materials rich with $M_2''O$ are low in softening point but show a tendency to slightly reduce the luminous flux.

There were similarly produced the fluorescent lamps by using the powdered glass materials shown in Tables 1-5 and other powdered glass materials defined by the above-shown general formulae, and it was found that all of these fluorescent lamps had a coating film strong enough to stand practical use. There was also noted a tendency that use of the powdered glass material with low water solubility gives a slightly better luminous flux.

TABLE 7

| Example No. | Glass composition (mol %) | | | | Softening point (°C.) | Amount added (wt %) | Luminous flux | | |
|---|---|---|---|---|---|---|---|---|---|
| | Ln | M | M" | $B_2O_3$ | | | 0 hr (lm) | 100 hr (lm) | Decay factor (%) |
| 14 | La(10) | Mg(37) | Li(3) | 50 | 673 | 2 | 1809 | 1732 | 4.3 |
| 15 | La(10) | Mg(37) | Li(3) | 50 | 673 | 3 | 1753 | 1675 | 4.4 |
| 16 | La(10) | Mg(36) | Li(4) | 50 | 662 | 5 | 1735 | 1683 | 3.0 |
| 17 | La(10) | Mg(35) | Li(5) | 50 | 655 | 3 | 1730 | 1662 | 3.9 |
| 18 | La(10) | Mg(30) | Li(10) | 50 | 619 | 3 | 1742 | 1658 | 4.8 |

EXAMPLES 19-24

The phosphor coating compositions were prepared in the same way as Example 1 except for use of an $La_2O_3$-$MgO$-$Li_2O_3$-$B_2O_3$ (10/37/3/50 by mole) glass powder in the amounts shown in Table 8 with extra addition of $Sr(NO_3)_2$ in the amounts also shown in Table 8. The compositions were allowed to stand for the periods shown in Table 8 and then treated in the similar way to Example 1 to produce the fluorescent lamps. As seen from Table 8, no drop of lamp luminous flux was caused even when using the compositions after long-time preservation. The same held true with the compositions containing $Ba(NO_3)_2$.

TABLE 8

| Example No. | Glass powder loading (wt %) | Amount of $Sr(NO_3)_2$ added (wt %) | Time allowed to stand (days) | Luminous flux (0 hr) lm |
|---|---|---|---|---|
| 19 | 3 | 0 | 0 | 1753 |
| 20 | " | " | 7 | 1604 |
| 21 | " | 0.1 | 0 | 1819 |
| 22 | " | " | 7 | 1879 |
| 23 | 1.5 | 0.5 | 0 | 1807 |
| 24 | " | " | 7 | 1841 |

There were also similarly produced the fluorescent lamps by using the glass powders shown in Tables 1-5 and other glass powders defined by the above-shown general formulae (I) and (II), and all of these fluorescent lamps had a coating film strong enough to stand practical use. There was seen a tendency that a slightly better luminous flux is provided by using the glass powder with low water solubility.

The similar results were obtained when using a halophosphate phosphor as well as when using other types of phosphor, for example, a mixture of three different kinds of phosphors which radiate in different colors such as blue, green and red, respectively, which provides a so-called high-color-rendering fluorescent lamp.

What is claimed is:

1. A fluorescent lamp having a phosphor layer formed on the inner wall of the glass tube of the lamp, said phosphor layer being composed of a glass material represented by the general formula: $xLn_2O_3 \cdot yMO \cdot wM' \cdot vM_2''O \cdot zB_2O_3$ (wherein Ln is at least one element selected from the group consisting of Y and lanthanum series elements, M is at least one element selected from the group consisting of Mg, Ca, Sr, Ba and Zn, M' is at least one oxide selected from the group consisting of $Al_2O_3$, $SiO_2$ and $Sb_2O_3$, M" is at least one element selected from the group consisting of Li, Na and K, and x, y, z, w and v are the numerical values defined by $1 \leq x \leq 30$, $0 \leq y \leq 60$, $0 \leq w \leq 20$, $0 < v \leq 15$ and $30 \leq z \leq 80$ in molar percent, respectively, but $y + w$ is a value defined by $0 \leq y + w \leq 60$ in molar percent) and a phosphor blended in an amount of 10 to 1000 parts by weight to one part by weight of said glass material.

2. The fluorescent lamp according to claim 1, wherein the amount of said phosphor is within the range of 15 to 200 parts by weight to one part by weight of said glass material.

3. The fluorescent lamp according to claim 1, wherein x in the general formula is a numerical value defined by $1 \leq x \leq 20$ in molar percent.

4. The fluorescent lamp according to claim 1 or 3, wherein Ln in the general formula is La.

5. The fluorescent lamp according to claim 1 or 3, wherein Ln in the general formula is Y.

6. The fluorescent lamp according to claim 1 or 3, wherein Ln in the general formula is Gd.

7. The fluorescent lamp according to claim 1, where y in the general formula is a numerical value defined by $0 \leq y \leq 50$ in molar percent.

8. The fluorescent lamp according to claim 1 or 7, wherein M in the general formula is at least one element selected from the group consisting of Zn, Mg and Ca.

9. The fluorescent lamp according to claim 1, wherein z in the general formula is a numerical value defined by $40 \leq z \leq 70$ in molar percent.

10. The fluorescent lamp according to claim 1, wherein v in the general formula is a numerical value defined by $1 \leq v \leq 15$ in molar percent.

11. The fluorescent lamp according to claim 1, wherein Ln represents lanthanum.

\* \* \* \* \*